US012635706B2

(12) United States Patent
Heijman et al.

(10) Patent No.: US 12,635,706 B2
(45) Date of Patent: May 26, 2026

(54) PROCESS TO PREPARE A LIQUID COFFEE CONCENTRATE WITH REDUCED ACRYLAMIDE CONTENT BY RESIN TREATMENT

(71) Applicant: Koninklijke Douwe Egberts B.V., Utrecht (NL)

(72) Inventors: Gertjan Heijman, Utrecht (NL); Rebecca Van Der Westen Skogvold, Utrecht (NL); Ian Brown, Banbury (GB); Ellen Roos, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 712 days.

(21) Appl. No.: 17/787,251

(22) PCT Filed: Dec. 18, 2020

(86) PCT No.: PCT/EP2020/087015
§ 371 (c)(1),
(2) Date: Jun. 17, 2022

(87) PCT Pub. No.: WO2021/123161
PCT Pub. Date: Jun. 24, 2021

(65) Prior Publication Data
US 2023/0023081 A1     Jan. 26, 2023

(30) Foreign Application Priority Data
Dec. 20, 2019     (GB) ...................................... 1919065

(51) Int. Cl.
*A23F 5/18*        (2006.01)
*A23F 5/28*        (2006.01)
*A23L 5/20*        (2016.01)

(52) U.S. Cl.
CPC ................ *A23F 5/185* (2013.01); *A23F 5/28* (2013.01); *A23L 5/273* (2016.08)

(58) Field of Classification Search
CPC .... A23F 5/185; A23F 5/28; A23F 5/26; A23F 5/16; A23F 5/08; A23F 5/10; A23F 5/18;
(Continued)

(56) References Cited

U.S. PATENT DOCUMENTS 4,707,368 A * 11/1987 Vogel ..................... A23F 5/486
                                                            426/434
6,165,536 A * 12/2000 Heeb ......................... A23F 3/18
                                                            426/594

(Continued)

FOREIGN PATENT DOCUMENTS

CN        103813716 A       5/2014
CN        104968209 A      10/2015
(Continued)

OTHER PUBLICATIONS

LANXESS [Lewatit® AF 5, Product Information, 2012], pp. 1-3 (Year: 2012).*
(Continued)

*Primary Examiner* — Erik Kashnikow
*Assistant Examiner* — Luis Eugenio Diou Berdecia
(74) *Attorney, Agent, or Firm* — Fitch, Even, Tabin & Flannery LLP

(57)     ABSTRACT

A process for producing a liquid coffee concentrate that has a reduced acrylamide content. The process involves contacting a low aromatic aqueous coffee extract with a carbon and/or silica based resin with adsorptive function to reduce the acrylamide content of the extract, prior to combining the treated extract with a high aromatic aqueous coffee extract. In particular, the process comprises the steps of: a) providing a low aromatic aqueous coffee extract having a first acryl-
(Continued)

amide content; b) providing a high aromatic aqueous coffee extract; c) contacting the low aromatic aqueous coffee extract with a carbon and/or silica based resin with adsorptive function to provide a low aromatic aqueous coffee extract having a second acrylamide content; and d) combining the low aromatic aqueous coffee extract having a second acrylamide content and the high aromatic aqueous coffee extract to provide a liquid coffee concentrate, wherein the second acrylamide content is lower than the first acrylamide content.

12 Claims, 1 Drawing Sheet

(58) Field of Classification Search
CPC .... A23F 5/36; A23F 5/243; A23F 5/24; A23F 5/04; A23F 5/262; A23F 5/32; A23F 5/34; A23F 5/46; A23F 5/00; A23F 5/48; A23L 5/273; A23V 2002/00; A23V 2300/30; A23V 2250/5028; A23V 2250/2108
USPC ................................ 426/594, 595, 271, 432
See application file for complete search history.

(56) References Cited

U.S. PATENT DOCUMENTS

| | | | | |
|---|---|---|---|---|
| 7,220,440 | B2 | 5/2007 | Dria | |
| 8,658,231 | B2 | 2/2014 | Penson | |
| 2004/0081724 | A1 * | 4/2004 | Dria .............. | C12Y 305/01001 426/52 |
| 2008/0299283 | A1 * | 12/2008 | Penson ..................... | A23F 5/18 426/655 |
| 2009/0123626 | A1 * | 5/2009 | Rommens .......... | C12N 15/8251 426/549 |
| 2014/0147562 | A1 * | 5/2014 | Heijman ................. | A23F 5/505 426/594 |

FOREIGN PATENT DOCUMENTS

| | | | | |
|---|---|---|---|---|
| CN | 113976075 | A | 1/2022 | |
| CN | 114901077 | A | 8/2022 | |
| EP | 0363529 | | 4/1990 | |
| EP | 3254568 | | 12/2017 | |
| EP | 3254568 | A1 * | 12/2017 | ............. A23F 5/185 |
| JP | 2014521346 | | 8/2014 | |
| RU | 2014103441 | A | 8/2015 | |
| RU | 2606017 | C2 | 1/2017 | |
| WO | 2007043873 | | 4/2007 | |
| WO | 2013005145 | | 1/2013 | |
| WO | 2013019112 | | 2/2013 | |
| WO | 2014123412 | | 8/2014 | |
| WO | 2017004715 | | 1/2017 | |
| WO | 2017211987 | A1 | 12/2017 | |
| WO | 2021123161 | | 6/2021 | |
| WO | 2021123163 | | 6/2021 | |

OTHER PUBLICATIONS

LANXESS Regeneration [Lewatit® AF 5, Product Information, 2012], pp. 1-4 (Year: 2012).*

Mojska et al., Studies of acrylamide level in coffee and coffee substitutes, (2013), pp. 173-181 (Year: 2013).*

First Office Action dated Feb. 7, 2024, Chinese Patent Application No. 202080088564.9, with English translation (14 pgs.).

Clarke R.J. and Vitzthum O.G. (Coffee Recent Developments, 2001, ISBN 0-632-05553-7, p. 71, table 3.3) (1 pg.).

Japanese Notice of Reasons for Refusal, dated May 16, 2023, Japanese Patent Application No. 2022-537507, with English translation (5 pgs.).

Russian Office Action, dated May 4, 2023, Russian Patent Application No. 2022118600 , with English translation (12 pgs.).

Lewatit® AF5, dated May 11, 2012 (English translation) (3 pgs.).

Combined Search and Examination Report), dated May 29, 2020, Great Britian Application No. GB1919065.1 (5 pgs.).

Examination Report, dated Mar. 1, 2022, Great Britian Application No. GB1919065.1 (4 pgs.).

International Search Report, date of mailing Apr. 19, 2021, International Application No. PCT/EP2020/087015 (4 pgs.).

Lanxess: "Product information Lewatit AF5", Oct. 13, 2011 (Oct. 13, 2011), pp. 1-4, XP055793537, Retrieved from the Internet: URL:https://www.lenntech.com/Data-sheets/Lewatit-AF-5-L.pdf [retrieved on Apr. 8, 2021] the whole document.

Written Opinion of the International Searching Authority, date of mailing Apr. 19, 2021, International Application No. PCT/EP2020/087015 (6 pgs.).

* cited by examiner

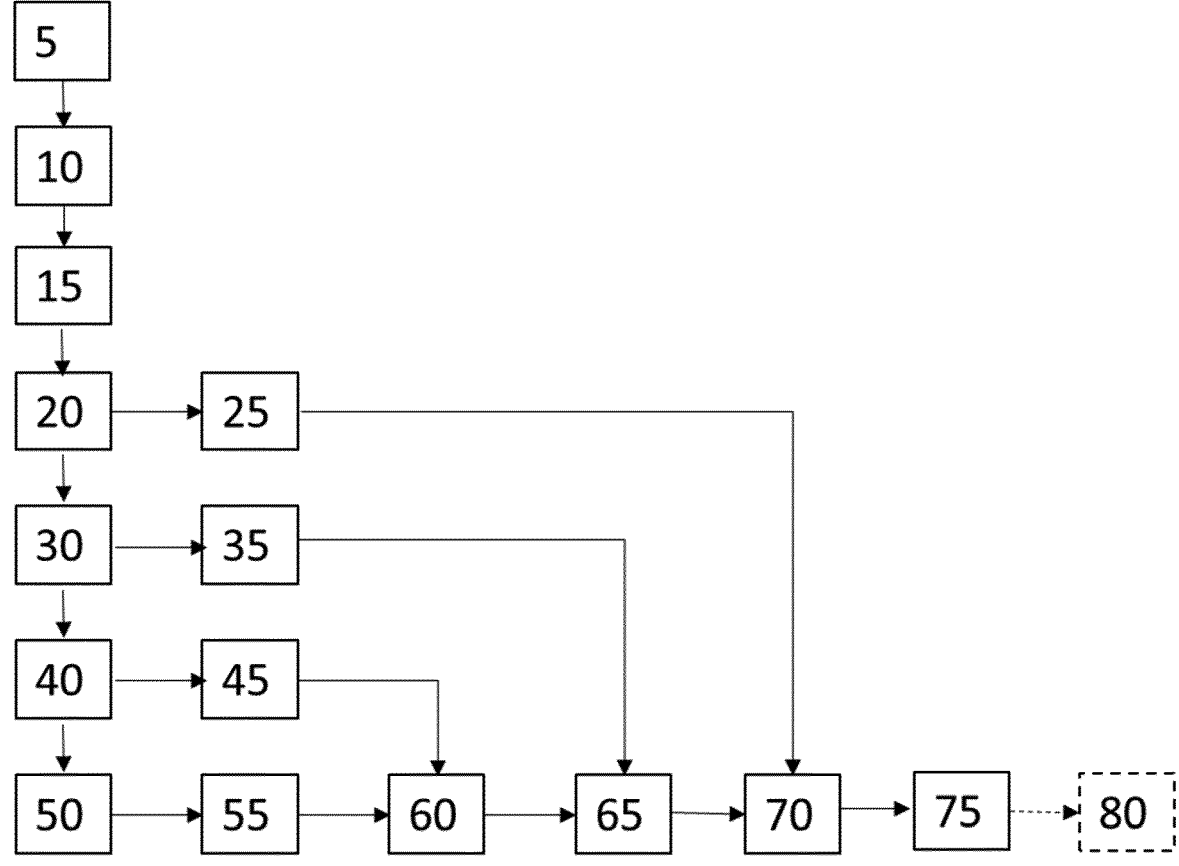

PROCESS TO PREPARE A LIQUID COFFEE CONCENTRATE WITH REDUCED ACRYLAMIDE CONTENT BY RESIN TREATMENT

CROSS REFERENCE TO RELATED APPLICATIONS

This application is a U.S. national phase application of International Application No. PCT/EP2020/087015, filed Dec. 18, 2020, which claims benefit from United Kingdom Application 1919065.1, filed Dec. 20, 2019, which are each hereby incorporated herein by reference in their entirety.

FIELD

The present invention relates to a process for producing a liquid coffee concentrate that has a reduced acrylamide content.

BACKGROUND

The extraction of roast and ground coffee with water to obtain a high coffee-solids liquid coffee concentrate is well known. Moreover, it is well known to dry such a concentrate with spray- or freeze-drying to obtain a soluble beverage product. The liquid coffee concentrate and the soluble beverage product can then be reconstituted at the consumer's convenience with hot water to obtain a coffee beverage. The industrial production of liquid coffee concentrates is associated with higher temperatures and pressures than coffee shop brewing systems. This allows a higher yield to be obtained from the beans and hence a higher profitability, but has a side-effect that the coffee can adopt undesirable processing flavour notes.

More recently it has been discovered that food products that are subjected to high temperatures during processing often contain high levels of acrylamide. For example, it has been found that the highest amount of acrylamide is formed in coffee beans during the first minutes of the roasting process. Since acrylamide is a potentially carcinogenic substance, the food industry is required to comply with efforts to reduce the levels of acrylamide in food. It is therefore desirable to implement measures to reduce the levels of acrylamide that accumulate during the coffee production.

EP0363529 discloses a method for obtaining an increased yield when obtaining a coffee extract from roasted and ground coffee beans. In particular, the method focuses on the hydrolysis of a partially extracted coffee under high temperatures in short processing times. WO2013/005145 discloses a method for reducing the content of acrylamide in a roasted coffee comprising reducing the asparagine content and reducing the aspartic acid content in an unroasted coffee. WO2017/004715 discloses development of an asparagine-reducing yeast by adaptive evolution and uses thereof to reduce acrylamide formation.

The reduction of acrylamide in coffee can be achieved by reducing or eliminating the levels of asparagine, a precursor required for the formation of acrylamide. U.S. Pat. No. 7,220,440 describes such a method of reducing the level of asparagine in unroasted coffee beans comprising adding an asparagine-reducing enzyme, for example asparaginase, to the unroasted coffee beans. This reduces the level of asparagine with a subsequent reduction in acrylamide formation upon roasting. The method utilises an enzymatic treatment of the unroasted coffee beans. However, the method typically results in 'off-flavours', which can have a negative impact on the overall aroma and flavour profile of the final coffee product. Furthermore, un-immobilised enzymes may be inadvertently and impermissibly retained in the final coffee product.

More recently, it has been shown that acrylamide can be removed directly from coffee extracts obtained from the roasted beans. EP3254568 describes the use of an adsorbent resin for reducing acrylamide in a liquid coffee extract or soluble coffee. In this method, a liquid coffee extract is flowed over a bed of cationic adsorbent resin to achieve a reduction in acrylamide content. This method avoids some of the issues associated with enzyme activity on the unroasted beans. However, the production of coffee having a specific aroma and flavour profile is a precise and complex process, and any additional treatment step can adversely affect the properties of the final coffee product. Therefore, treatment of the liquid extract with an adsorbent resin can alter the aroma components present in the extract, and consequently may negatively affect the taste of the final coffee product.

SUMMARY

Accordingly, it is desirable to provide an improved process for making a liquid coffee concentrate or soluble coffee, improved coffee products and/or to tackle at least some of the problems associated with the prior art or, at least, to provide a commercially viable alternative thereto. Therefore, it is an object of the present invention to provide a process of producing a liquid coffee concentrate or soluble coffee with a reduced acrylamide content that has a lower impact on the aroma and flavour profile of the final coffee product compared to the prior art.

The process involves contacting a low aromatic aqueous coffee extract with a carbon and/or silica based resin with adsorptive function to reduce the acrylamide content of the extract, prior to combining the treated extract with a high aromatic aqueous coffee extract. The invention also relates to a liquid coffee concentrate with reduced acrylamide content produced in accordance with the processes disclosed herein. The invention further provides a soluble coffee prepared by freeze or spray drying the liquid coffee concentrate with reduced acrylamide content. Finally, the invention provides a use of a carbon and/or silica based resin with adsorptive function for reducing the acrylamide content of a low aromatic aqueous coffee extract.

The present invention has a number of advantages over prior art methods as will become apparent from the discussion below. One advantage of the present process is that the resultant coffee concentrate has a reduced level of acrylamide whilst the impact on the aroma and flavour profile of the final product is lower than that observed in the prior art. In particular, by subjecting only the low aromatic extract to the acrylamide reduction step, only a percentage of the total extract is treated, and therefore there is less interference with the properties of the final coffee product. Furthermore, by recovering the aroma components prior to performing the acrylamide reduction step, the majority of the desirable aromatic compounds are preserved and therefore acrylamide can be removed with a lower impact on the quality of the resultant coffee product compared to the prior art.

In a first aspect, the present invention provides a process for producing a liquid coffee concentrate, the process comprising the steps of:

a) providing a low aromatic aqueous coffee extract having a first acrylamide content;

b) providing a high aromatic aqueous coffee extract;

c) contacting the low aromatic aqueous coffee extract with a carbon and/or silica based resin with adsorptive function to provide a low aromatic aqueous coffee extract having a second acrylamide content; and d) combining the low aromatic aqueous coffee extract having a second acrylamide content and the high aromatic aqueous coffee extract to provide a liquid coffee concentrate, wherein the second acrylamide content is lower than the first acrylamide content.

By a "liquid coffee concentrate" it is meant a concentrated solution comprising soluble coffee solids, suitable for dilution to obtain a coffee beverage of conventional solids levels. Liquid coffee concentrates are often sold as so-called bag-in-box products for dilution in vending machines to obtain coffee beverages. A liquid coffee concentrate comprises 6 to 80% wt coffee solids preferable 10 to 65% wt more 15 to 50% wt coffee solids.

An "aqueous coffee extract" is a solution comprising soluble coffee compounds. These are obtained by contacting roast and ground coffee beans, with water, typically hot water or steam. Depending on the temperature and pressure used for the extraction, the yield of soluble coffee compounds obtained from the roast and ground coffee will vary. High temperatures result in high yields, hydrolysing complex carbohydrates in the roast and ground coffee into soluble components. While high yields are obviously desirable for commercial production, they also result in the production of undesirable flavours and in the extraction of acrylamide.

The "low aromatic aqueous coffee extract" may be characterised based on the chemical components present in the extract. For example, a low aromatic aqueous coffee extract may be considered one which has a ratio of 2, 3 butanedione to ethylguaiacol of less than 30:1. This extract is often called secondary extract. Similarly, the high aromatic aqueous coffee extract may be characterised based on a ratio of 2, 3 butanedione to ethylguaiacol of more than 30:1. Preferably the ratio of 2, 3 butanedione to ethylguaiacol in the low aromatic extract is at most half that in the high aromatic extract (e.g. 20:1 in the low aromatic extract compared to 40:1 in the high aromatic extract), more preferably at most one third, more preferably at most one quarter.

Preferably the low aromatic aqueous coffee extract having a first acrylamide content is obtained by the aqueous extraction of dearomatised roasted and ground coffee. By "dearomatised roasted and ground coffee" it is meant that the roasted and ground coffee has been previously subjected to at least one primary extraction step, such as an extraction in water at a temperature of from 100-170° C., preferably 120-150° C. Alternatively or in addition, the dearomatised roasted and ground coffee can be obtained by subjecting roasted and ground coffee to an aroma recovery process, such as one involving contacting the roasted and ground coffee with steam. Such aroma recovery process provides a high aromatic aqueous coffee extract from the steam. Dearomatised roasted and ground coffee is also produced in the aroma recovery process.

Preferably the low aromatic aqueous coffee extract having a first acrylamide content is obtained by aqueous extraction of the dearomatised roasted and ground coffee whereby the aqueous extraction is conducted at a temperature of from 140-230° C., preferably 160-200° C., preferably 160-195° C. If the coffee has already been subjected to a primary extraction step then this will be considered a secondary coffee extract. The dwell times at such temperatures are typically from 1 minute to 30 minutes. The resulting dearomatised roasted and ground coffee is often called "spent coffee".

In more preferred embodiments, the aqueous extraction is conducted at a temperature of above 200° C., preferably from 200 to 260° C., preferably 210-230° C., using spent coffee providing the low aromatic aqueous tertiary coffee extract. That is, because the extraction is performed on the spent coffee resulting from a secondary extraction step, it would be considered a tertiary extract. As will be appreciated, each of the primary, secondary and tertiary steps involves harsher extraction conditions. In certain embodiments, the aqueous extraction is conducted at a temperature of between 220° C. and 240° C. In certain embodiments, the aqueous extraction is conducted at a temperature of above 221° C. The dwell times at such temperatures are typically from 1 minute to 15 minutes. Such high temperatures are associated with high yields and the production of undesirable off-flavours and acrylamide content.

For the avoidance of doubt, a primary coffee extract is obtained by aqueous extraction of roasted coffee beans that have not previously been extracted (or have only be subjected to an aroma recovery step). A secondary coffee extract is obtained by aqueous extraction of roasted coffee beans that have previously been extracted with hot water. A tertiary coffee extract is obtained by aqueous extraction of roasted coffee beans that have previously been extracted with hot water twice. The extract conditions (i.e. temperature) typically increase with each of the primary, secondary and tertiary extraction steps.

The low aromatic aqueous coffee extract is typically a secondary or tertiary extract or a combination of the two. In one embodiment the low aromatic aqueous coffee extract having a first acrylamide content is a mixture of secondary and tertiary coffee extracts.

Preferably, contacting the low aromatic aqueous coffee extract with a carbon and/or silica based resin with adsorptive function comprises flowing the low aromatic aqueous coffee extract through a bed comprising the carbon and/or silica based resin with adsorptive function. This ensures a high surface area for treating the soluble coffee solids in the extract.

Preferably the carbon and/or silica based resin with adsorptive function is monolithic silica, an anion/cation exchanger or a size exclusion resin with affinity for molecules with a dipole. Preferably, the resin comprises particles having a surface area between 700 $m^2/g$ and 1500 $m^2/g$, preferably between 900 and 1500 $m^2/g$, more preferably about 1200 $m^2/g$. Preferably, the resin comprises particles having a pore volume between 0.08 $cm^3/g$ and 0.2 $cm^3/g$, preferably about 0.15 $cm^3/g$.

In certain embodiments, the second acrylamide content is at least 10%, at least 20%, at least 30%, at least 40%, at least 50%, at least 60%, at least 70%, at least 80%, at least 90%, at least 95%, at least 99% or 100% lower than the first acrylamide content.

In certain embodiments, both a low aromatic aqueous secondary coffee extract and a low aromatic aqueous tertiary coffee extract may be treated according to the first aspect of the invention, contacting the aqueous coffee extracts with a carbon and/or silica based resin with adsorptive function, flowing the aqueous coffee extracts through a bed comprising the carbon and/or silica based resin with adsorptive function.

In certain embodiments, only a low aromatic aqueous secondary coffee extract or alternatively only a low aromatic aqueous tertiary coffee extract may be treated according to the first aspect of the invention, contacting the aqueous coffee extract with a carbon and/or silica based resin with adsorptive function, flowing the aqueous coffee extract through a bed comprising the carbon and/or silica based resin with adsorptive function.

In a second aspect, the present invention provides a liquid coffee concentrate or soluble coffee product obtainable according to the process described in the first aspect. This product is characterised by having the extraction profile of a more intensively processed coffee extract (i.e. a higher yield) coupled with low levels of acrylamide.

Preferably the process further comprises a step of concentrating the low aromatic aqueous coffee extract having a second acrylamide content. Low solids contents can be associated with higher extraction yields from the beans, but higher solids are required for a useful product to be obtained.

Alternatively, the process further comprises a step of drying, thereby producing a soluble coffee product.

Preferably the process further comprises regenerating the spent resin. This permits the process to be conducted on a continuous basis.

In certain embodiments, the liquid coffee concentrate or soluble coffee product has a reduced acrylamide level of 2%-50% wt reduction. Acrylamide levels can be measured by Liquid Chromatography technique (LC) with Mass Spectrometry (MS) as detection method using Electrospray ionization (LC-ESI-MS/MS) and are measured on the basis of the dry weight of the relevant extract.

The coffee product is preferably made by combining untreated primary extract with a treated secondary and/or tertiary extract. The ratio of treated to untreated extracts in the product will have an effect on the level of acrylamide reduction observed. The higher the proportion treated, the lower the acrylamide content. However, the greater proportion treated the greater the divergence of the product from the original flavour.

In a third aspect, the present invention provides the use of a carbon and/or silica based resin with adsorptive function for reducing the acrylamide content of a low aromatic aqueous coffee extract, wherein the carbon and/or silica based resin with adsorptive function is selective for acrylamide.

DETAILED DESCRIPTION

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

A. Process for Producing a Liquid Coffee Concentrate

The present invention is based on the finding that it is particularly advantageous to conduct an acrylamide reduction step on a low aromatic aqueous coffee extract. This extract is typically obtained from roasted and ground coffee beans that have previously been subjected to at least an aroma recovery process and a primary extraction process. A low aromatic aqueous coffee extract can be obtained from this dearomatised roasted and ground coffee. The low aromatic aqueous coffee extract is subsequently flowed through a bed comprising a carbon and/or silica based resin with adsorptive function in order to remove acrylamide from the extract. The carbon and/or silica based resin with adsorptive function, as will be explained elsewhere herein, have a microporous physical structure that allows for the selective adsorption of polar organic substances and/or ions. A carbon and/or silica based resin with adsorptive function that is selective for acrylamide can be used to selectively extract acrylamide from an aqueous coffee extract.

According to a first aspect of the invention, there is provided a process for producing a liquid coffee concentrate. The process comprises the steps of:

a) providing a low aromatic aqueous coffee extract having a first acrylamide content;

b) providing a high aromatic aqueous coffee extract;

c) contacting the low aromatic aqueous coffee extract with a carbon and/or silica based resin with adsorptive function to provide a low aromatic aqueous coffee extract having a second acrylamide content; and d) combining the low aromatic aqueous coffee extract having a second acrylamide content and the high aromatic aqueous coffee extract to provide a liquid coffee concentrate, wherein the second acrylamide content is lower than the first acrylamide content.

The process comprises a number of steps. It will be apparent that a number of these steps must be conducted sequentially, but it should also be appreciated that the steps can be conducted as part of a continuous process, batchwise or a combination of the two.

i. Roasted and Ground Coffee

According to a step of the process (step a), a low aromatic aqueous coffee extract having a first acrylamide content is provided. According to a further step of the method (step b), a high aromatic aqueous coffee extract is also provided. The coffee extracts may be obtained from raw coffee beans which have been roasted and ground using well established techniques in the art. The raw coffee beans can be a mixture of different types of coffee beans. For example, the raw coffee beans can be a mixture of coffee *Arabica* and coffee *Robusta*. The process of grinding the roasted coffee beans requires that a compromise is sought between obtaining the largest possible surface area of ground coffee beans and obtaining the lowest possible pressure drop across the extraction cell. Typically, the ground coffee beans have an average size of at most 2.0 millimetres.

ii. Aroma Recovery Process

In order to better preserve coffee aromas, the acrylamide reduction step (step c) of the present invention is conducted on a low aromatic aqueous coffee extract. This avoids the loss of desirable aromas to the carbon and/or silica based resin with adsorptive function and also reduces the volume of extract to be treated.

This low aromatic aqueous coffee extract having a first acrylamide content is obtained by subjecting roasted and ground coffee to an aroma recovery process and, optionally a primary extraction, and performing an extraction step on the remaining dearomatised roasted and ground coffee. The aroma recovery process provides both a high aromatic aqueous coffee extract, which can be stored for later use, and dearomatised roasted and ground coffee which can be used for extraction. Therefore, prior to commencement of the extraction process performed on the dearomatised and/or spent roasted and ground coffee, aroma recovery is performed on the roast and ground coffee to recover the most volatile and desirable aromas. The resulting aroma-rich steam is condensed and stored under chilled conditions to be later combined with the treated low aromatic aqueous extract. Accordingly, the process of producing a liquid coffee concentrate comprises subjecting roasted and ground coffee to an aroma recovery process to obtain: (i) a high aromatic aqueous coffee extract; and (ii) dearomatised roasted and ground coffee.

Examples of aroma recovery include steam stripping, or supercritical $CO_2$ extraction. Preferably, the aroma recovery process involves contacting the roasted and ground coffee with steam, to strip any aromas from the coffee, followed by subsequent recovery of the aromas from the steam as a high aromatic aqueous coffee extract. Preferably, the aroma recovery step is conducted under vacuum. In certain embodiments, the aroma recovery process involves contacting the roasted and ground coffee with steam and recovering the high aromatic aqueous coffee extract from the steam.

As known to a skilled person, a high aromatic coffee extract distinguishes itself from a low aromatic coffee extract by having a comparably high amount of volatile flavour compounds compared to semi-volatile flavour compounds. Such compounds are known for example from Clarke R. J. and Vitzthum O. G. (*Coffee Recent Developments,* 2001, ISBN 0-632-05553-7, p. 71, table 3.3). From this table it is clear that on the one hand propanal, methyl propanal, and 2,3 butanedione are measurable volatile flavour compounds. Pyrazine compounds and guaiacol compounds on the other hand are semi-volatile flavour compounds. Taking 2,3-butanedione as an example of a volatile coffee flavour compound and ethylguaiacol (4-ethyl 2-methoxyphenol) as an example of a semi-volatile coffee flavour compound, when these compounds are in a wt/wt ratio of 2,3-butanedione to ethylguaiacol of more than 30 in a particular coffee extract, that extract can be described as a high aromatic coffee extract. Consequently, a low aromatic coffee extract has a wt/wt ratio of 2,3-butanedione to ethylguaiacol of less than 30.

iii. Extraction

The low aromatic aqueous coffee extract may be obtained by any known extraction technique. For example, the aqueous extract may be prepared by counter-current percolator extraction of coffee. The low aromatic aqueous coffee extract may be obtained by the aqueous extraction of dearomatised roasted and ground coffee.

For example, in certain embodiments, the dearomatised roasted and ground coffee is subjected to one or more aqueous extraction steps to produce one or more aqueous coffee extracts. The dearomatised roasted and ground coffee may be subjected to a plurality of extraction steps to produce a plurality of extracts. The dearomatised roasted and ground coffee may be subjected to an aqueous extraction at a temperature of above 100° C. Preferably, the dearomatised roasted and ground coffee is subjected to an aqueous extraction at a temperature of above 140° C. The dwell times at such temperatures are typically from 1 minute to 30 minutes. In more preferred embodiments, the aqueous extraction is conducted at a temperature of above 200° C., preferably from 200 to 260° C. In certain embodiments, the aqueous extraction is conducted at a temperature of between 220° C. and 240° C. In certain embodiments, the aqueous extraction is conducted at a temperature of above 221° C. The dwell times at such temperatures are typically from 1 minute to 15 minutes, preferably from 3 minutes to 13 minutes, more preferably from 3 minutes to 8 minutes. Preferably, extraction of dearomatised roasted and ground coffee provides at least a low aromatic aqueous coffee extract having a first acrylamide content. The low aromatic aqueous coffee extract is preferably a secondary and/or tertiary coffee extract as described herein. It is this low aromatic aqueous coffee extract having a first acrylamide content that is subjected to an acrylamide reduction step (step c).

Due to the high temperatures employed during the extraction process, especially by providing the tertiary extract above 200° C. the pressure in the reactor may vary. Accordingly, in certain embodiments, the aqueous extraction is conducted at a pressure of about 5 to 20 atmospheres, preferably 17 to about 14 atmospheres. Since high temperatures can negatively impact on the overall flavour and aroma properties of the coffee, it is desirable to control the reaction time to within the prescribed period with great reliability.

The dearomatised roasted and ground coffee may be subjected to an initial aqueous extraction (a primary extraction) at a temperature of below 170° C. to obtain a primary aroma-rich extract. Preferably, the initial aqueous extraction is conducted at a temperature of 100 to 170° C., more preferably 140° C. to 170° C. This initial extraction step produces a further aqueous coffee extract which can be stored along with the recovered high aromatic aqueous coffee extract. The aroma-rich extracts can be stored whilst the acrylamide reduction step (step c) is performed on the low aromatic aqueous coffee extract, before the individual extracts are combined. In certain embodiments, the initial extraction step produces a further aqueous coffee extract which can be combined with the high aromatic aqueous coffee extract and the low aromatic aqueous coffee extract having a second acrylamide content.

In a preferred embodiment, the aqueous extraction is preferably done as a split extraction. Processes of split extraction are known. A reference in this respect is WO 2007/043873. In the split extraction method, roasted and ground coffee is subjected to a primary extraction with water whereby a primary aroma-rich extract is obtained with a draw-off factor of at most 2.5, preferably at most 2.0, more preferably at most 1.5 and most preferably at most 1.0. Thereafter, optionally, a second primary extract is obtained. Preferably, the water-coffee ratio is between 5.0 and 15. More preferably, the water-coffee ratio is lower than 10, and most preferably, the water-coffee ratio is between 6.5 and 8.5.

The term "draw-off factor" is understood to mean the ratio of the mass of the extract and the mass of the dry roasted and ground coffee in the primary extraction cell. In practice, this draw-off factor is determined by a compromise between, on the one side, a sufficient degree of coffee aroma recovery in the first primary extract, and, on the other side, a lowest possible volume of the first primary extract. The draw-off factor for that matter depends on the coarseness or degree of grinding of the roasted coffee, the extraction cell and, in particular, the number of percolators placed in series, the water-coffee ratio, the cycle time, the feed water temperature and the desired concentration of the end product and the like.

In embodiments of split extraction, where a second primary extract is recovered from the primary extraction cell, this further extraction also takes place in the primary extraction cell after draw-off and storage of the first primary extract.

The primarily extracted, roasted, ground coffee is then fed to a further extraction section in which a subsequent extract is obtained (a low aromatic aqueous coffee extract). Optionally, the second primary extract may be added to this subsequent extract. Optionally, the primarily extracted, roasted, ground coffee may be subjected to a plurality of extraction steps to produce a plurality of subsequent extracts.

The primary and subsequent extractions can be carried out in customary extraction cells. In a preferred embodiment, both the primary and the subsequent extraction(s) are carried out in a percolator or in percolators placed in series. In particular, the subsequent extraction(s) is advantageously carried out in at least 2, and preferably at least 4 series-connected percolators. As a rule, the number of percolators used in the primary extraction section is at least 0.5 which means that during 50% of the cycle time a percolator is connected in the primary extraction section. Preferably, at least 1 or 2 percolators are connected in the primary extraction section.

In embodiments where the dearomatised roasted and ground coffee has been subjected to a plurality of extraction steps, the coffee extracts provided in steps a) and b) may be obtained by separating the plurality of extracts into a low aromatic aqueous coffee extract and a further high aromatic aqueous coffee extract, respectively.

iv. The Low Aromatic Aqueous Coffee Extract

The low aromatic aqueous coffee extract having a first acrylamide content is an undiluted or unconcentrated extract. An extract will generally have a dry matter solids content of 15% by weight or less, preferably of from 2 to 10% by weight. Preferably, the acrylamide reduction step (step c) is conducted on a concentrated extract, i.e. a dry matter solids of 15 to 60% by weight.

Most preferably, the low aromatic aqueous coffee extract that is subjected to an acrylamide reduction step (step c) is an extract that is low in aroma components and shows a considerable acrylamide content. Preferably, the low aromatic aqueous coffee extract has a high acrylamide content compared to the acrylamide content of other extract obtained in the extraction process. Preferably, the low aromatic aqueous coffee extract having a first acrylamide content contains greater than 10% of the total amount of acrylamide present in all the extracts obtained in the extraction process. Preferably, the low aromatic aqueous coffee extract having a first acrylamide content contains greater than 20% of the total amount of acrylamide present in all the extracts obtained in the extraction process.

v. Acrylamide Reduction

In accordance with the invention, the low aromatic aqueous coffee extract is contacted with a carbon and/or silica based resin with adsorptive function. The low aromatic aqueous coffee extract is contacted with a carbon and/or silica based resin with adsorptive function to provide a low aromatic aqueous coffee extract having a second acrylamide content.

Adsorption and ion-exchange are sorption processes in which certain adsorbates are selectively transferred from the fluid phase to the surface of insoluble, rigid particles which may be suspended in a vessel or packed in a column. The carbon and/or silica based resin with adsorptive function used in the present invention is selective for acrylamide. It is understood that the carbon and/or silica based resin with adsorptive function will retain acrylamide due to the affinity of the resin for acrylamide molecules.

Specifically, microporous resins that may be used in the present invention are of the size separation or exclusion type wherein a mixture of compounds may be separated by molecular size. The smaller hydrophobic molecules are more easily trapped in the small pores of the resin and therefore the smaller molecules are adsorbed onto the surface. Molecules that are too large do not penetrate the pores and will bypass the resin bed.

A suitable adsorbent resin is selected according to the molecule to be removed. There are different kind of adsorbent resins distinguished by a specific hydrophobic capacity, and by a particular size and volume of the pores. It is understood that any carbon and/or silica based resin with adsorptive function may be used in the present invention provided that it is suitable for adsorption and/or separation of acrylamide from the aqueous coffee extract. The acrylamide molecule has molecular weight of 71.08 g/mol. This molecular weight value is much less than the value of the soluble solids in the low aromatic aqueous coffee extract, and therefore the acrylamide molecules will be trapped by the small pores and will adsorb to the resin. The remaining extract comprising the soluble coffee solids will bypass the resin and can be collected.

A preferable embodiment is Lewatit® AF5.

The surface area provided by the microporous resin determines the adsorptive capacity of the resin. The carbon and/or silica based resin with adsorptive function appropriated to the objectives of the present invention is a microporous adsorber comprising particles having a surface area between 700 $m^2/g$ and 1500 $m^2/g$. In certain embodiments, the ion-exchange resin and/or adsorber comprises particles having a surface area between 900 $m^2/g$ and 1500 $m^2/g$. Preferably, the adsorber, or porous ion-exchange resin comprises particles having a surface area of about 1200 $m^2/g$.

Alternatively, or in addition, a carbon and/or silica based resin with adsorptive function comprises particles having a pore volume between 0.08 $cm^3/g$ and 0.2 $cm^3/g$. Preferably, the carbon and/or silica based resin with adsorptive function comprises particles having a pore volume of about 0.15 $cm^3/g$.

In accordance with the invention, the step (step c) of contacting a low aromatic aqueous coffee extract having a first acrylamide content with a carbon and/or silica based resin with adsorptive function produces a low aromatic aqueous coffee extract having a second acrylamide content. Importantly, in accordance with the invention, the second acrylamide content is lower than the first acrylamide content. In other words, the amount of acrylamide in the low aromatic aqueous extract is reduced after contact with the carbon and/or silica based resin with adsorptive function. In certain embodiments, the second acrylamide content is at least 10%, at least 20%, at least 30%, at least 40%, at least 50%, at least 60%, at least 70%, at least 80%, at least 90%, at least 95%, at least 99% or 100% lower than the first acrylamide content. The acrylamide content of the low aromatic aqueous coffee extract after contact with the resin is lower than the acrylamide content of the low aromatic aqueous coffee extract prior to contact with the resin. In particularly preferred embodiments, there is no acrylamide present in the low aromatic aqueous coffee extract after contact with the carbon and/or silica based resin with adsorptive function. Therefore, in certain embodiments, the low aromatic aqueous coffee extract having a second acrylamide content does not comprise any acrylamide.

The process may comprise flowing the low aromatic aqueous coffee extract through a bed comprising the a carbon and/or silica based resin with adsorptive function. Accordingly, in other embodiments, the process requires flowing the low aromatic aqueous coffee extract through a bed comprising the carbon and/or silica based resin with adsorptive function for a time sufficient to produce a low aromatic aqueous coffee extract having a second acrylamide content of at least 10%, at least 20%, at least 30%, at least 40%, at least 50%, at least 60%, at least 70%, at least 80%, at least 90%, at least 95%, at least 99% or 100% lower than the low aromatic aqueous coffee extract having a first acrylamide content.

At least 50 v/v %, more preferably 75 v/v %, most preferably 100% of the low aromatic aqueous coffee extract is contacted with the carbon and/or silica based resin with adsorptive function.

In embodiments, in which the a carbon and/or silica based resin with adsorptive function is packed in a column, the column must be of sufficient size and length in order to efficiently reduce or eliminate acrylamide from an aqueous coffee extract that passes through it.

Over time, contaminant ions and/or molecules are bound to all available sites in the resin. Once the resin is exhausted, it must be restored for further use through what is known as resin regeneration. During regeneration, the adsorption is essentially reversed through the application of a concentrated regenerant solution. Depending upon the type of resin and the application at hand, the regenerant may be a salt, acid, or caustic solution. As the regeneration cycle proceeds, the resin releases the adsorbed ions and organic molecules, swapping them for ions present in the regenerant solution. The eluted ions/molecules can be removed and disposed of. In most cases, the resin is rinsed to remove any residual regenerant prior to the re-use of the resin. Therefore, in another embodiment, the process further comprises regenerating the spent resin.

vi. Concentrating and Combining

According to a further step of the process (step d), the low aromatic aqueous coffee extract having a second acrylamide content and the high aromatic aqueous coffee extract are combined to provide a liquid coffee concentrate. The two coffee extracts are generally combined by simple mixing.

As mentioned elsewhere herein, in embodiments where an initial aqueous extraction step is performed at a temperature of below 170° C. to obtain a further aromatic aqueous coffee extract, the further aqueous coffee extract may be combined with the high aromatic aqueous coffee extract and the low aromatic aqueous coffee extract having a second acrylamide content.

As mentioned elsewhere herein, in embodiments where the dearomatised roasted and ground coffee has been subjected to a plurality of extraction steps, and the plurality of extracts are separated into a low aromatic aqueous coffee extract and a further high aromatic aqueous coffee extract, the further high aromatic aqueous coffee extract(s) may be combined with the high aromatic aqueous coffee extract of step (b) and the low aromatic aqueous coffee extract having a second acrylamide content.

In certain embodiments, the process further comprises a step of concentrating the low aromatic aqueous coffee extract having a second acrylamide content prior to the step of combining. In other words, the process may comprise an additional step between step c) and step d) of concentrating the low aromatic aqueous coffee extract having a second acrylamide content. Such extracts may need to be concentrated in order to achieve the desired level of soluble coffee solids. For example, an extract containing 2 to 20% by weight of soluble coffee solids, is then concentrated, for example by evaporation, by freezing concentration, or by filtration, until a concentration of 30 to 55% solid matter is reached. Preferred concentrates comprise 6 to 80 wt. % coffee solids, preferably 10 to 65 wt. %, more preferably 15 to 50 wt. %.

A concentrate is distinguished from an extract by having undergone a substantial water removing step such as water evaporation. Methods of concentration such as evaporation, freezing concentration, and filtration are well-known to the skilled person. Preferably the step of concentrating the low aromatic aqueous coffee extract having a second acrylamide content is conducted in an evaporator unit.

The recovered high aromatic aqueous coffee extract can then be combined with the concentrated low aromatic aqueous coffee extract having a second acrylamide content to form a liquid coffee concentrate. This improves the flavour of the extract without compromising the solids level. Furthermore, it is advantageous to concentrate the low aromatic extract prior to combining the concentrated extract with the high aromatic extract so as to preserve the aromas in the high aromatic extract which may otherwise have been lost during the concentration step.

Accordingly, in one embodiment there is provided a process for producing a liquid coffee concentrate, the process comprising the steps of:

a) providing a low aromatic aqueous coffee extract having a first acrylamide content;

b) providing a high aromatic aqueous coffee extract;

c) contacting the low aromatic aqueous coffee extract with a carbon and/or silica based resin with adsorptive function to provide a low aromatic aqueous coffee extract having a second acrylamide content;

d) concentrating the low aromatic aqueous coffee extract having a second acrylamide content; and e) combining the concentrated low aromatic aqueous coffee extract having a second acrylamide content and the high aromatic aqueous coffee extract to provide a liquid coffee concentrate, wherein the second acrylamide content is lower than the first acrylamide content.

In the event that part (e.g. at least 50%) of the low aromatic aqueous coffee extract has been subjected to the acrylamide reduction step (step c), the untreated low aromatic aqueous coffee extract may be combined with the treated low aromatic aqueous coffee extract, i.e. before concentration, or with the treated and concentrated low aromatic aqueous coffee extract, i.e. after concentration.

As mentioned elsewhere herein, the high aromatic aqueous coffee extract obtained from the aroma recovery process may be stored for later use. Preferably the high aromatic aqueous coffee extract is cooled and stored at a temperature below 25° C., more preferably below 10° C., most preferably below 0° C. After storage, the high aromatic aqueous coffee extract may be directly, without further processing, added to the concentrated low aromatic aqueous coffee extract having a second acrylamide content. It is preferred that the high aromatic aqueous coffee extract is stored as briefly as possible and cooled, preferably at an atmosphere of an inert gas such as nitrogen before combining with the concentrated low aromatic aqueous coffee extract having a second acrylamide content. Owing to these steps, loss of aroma and aroma degradation is limited as much as possible.

vii. Drying

In accordance with a further embodiment of the invention, the process may further comprise a step of drying, thereby producing a soluble coffee product. In certain embodiments, the soluble coffee product is a soluble powder. Preferably the drying step is freeze-drying since this helps to retain the preserved aroma profile of the product. Preferably the powder product has a particle size of from 200 to 3000 microns. Spray drying can also be used as a drying method.

viii. Liquid Coffee Concentrate/Soluble Coffee Product

In a further aspect, the present invention provides a liquid coffee concentrate or a soluble coffee product obtainable according to the processes described herein. The liquid coffee concentrate and/or the soluble coffee product are distinguished from other coffee concentrates and soluble coffee products on account of their reduced acrylamide content. For instance, in certain embodiments, the liquid coffee concentrate obtainable according to the processes described herein has a reduced acrylamide level of 2-50% compared to a untreated product. In another embodiment, the soluble coffee product obtainable according to the processes described herein has less than 2-50% acrylamide compared to a untreated product.

C: Use of a Carbon and/or Silica Based Resin with Adsorptive Function for Reducing the Acrylamide Content of a Low Aromatic Aqueous Coffee Extract In another aspect of the present invention, there is provided a use of a carbon and/or silica based resin with adsorptive function for reducing the acrylamide content of a low aromatic aqueous coffee extract. In certain embodiments, there is provided a use of a carbon and/or silica based resin with adsorptive function for reducing the acrylamide content of a low aromatic aqueous coffee extract, wherein the carbon and/or silica based resin with adsorptive function is selective for acrylamide. In other words, the carbon and/or silica based resin with adsorptive function is provided for separation and/or extraction of acrylamide from an aqueous coffee extract.

In accordance with the invention, the carbon and/or silica based resin with adsorptive function is used to reduce the acrylamide content of a low aromatic aqueous coffee extract. As explained elsewhere herein, it is advantageous to subject roasted and ground coffee beans to an aroma recovery process to preserve the aroma components. A low aromatic aqueous coffee extract can then be obtained, and acrylamide reduction can be performed on this low aromatic extract. This ensures that the acrylamide reduction process has a lower impact on the overall aroma and flavour profile of the coffee product compared to the prior art.

In certain embodiments, the use further comprises regenerating the spent resin. However, a further advantage associated with the use of a carbon and/or silica based resin with adsorptive function as provided herein is that only the low aromatic aqueous coffee extract is contacted with the resin. This is in contrast to previous methods which perform acrylamide reduction on the total aqueous coffee extract obtained from the extraction process. By contacting the carbon and/or silica based resin with adsorptive function with part of the volume of extract, the resin lasts longer and regeneration is not required until later.

All embodiments described in respect of the first aspect of the invention apply equally to this further aspect of the invention.

For example, the adsorber or porous ion-exchange resin may be a carbon-based microporous adsorber. Preferably, the ion-exchange resin and/or adsorber is Lewatit® AF5. In certain embodiments, the carbon and/or silica based resin with adsorptive function comprises particles having a surface area between 700 $m^2/g$ and 1500 $m^2/g$, more preferably 900 $m^2/g$ and 1500 $m^2/g$, most preferably about 1200 $m^2/g$. Alternatively, or in addition, the carbon and/or silica based resin with adsorptive function comprises particles having a pore volume between 0.08 $cm^3/g$ and 0.2 $cm^3/g$, more preferably about 0.15 $cm^3/g$.

In preferred embodiments, the use comprises contacting a low aromatic aqueous coffee extract with a carbon and/or silica based resin with adsorptive function. In other embodiments, the use comprises contacting the low aromatic aqueous coffee extract with a carbon and/or silica based resin with adsorptive function for a time sufficient to reduce the acrylamide content of the low aromatic aqueous coffee extract. In specific embodiments, the use comprises flowing a low aromatic aqueous coffee extract through a bed comprising the carbon and/or silica based resin with adsorptive function. In other embodiments, the use comprises flowing the low aromatic aqueous coffee extract through a bed comprising a carbon and/or silica based resin with adsorptive function for a time sufficient to reduce the acrylamide content of the low aromatic aqueous coffee extract. In certain embodiments, the acrylamide content is reduced by at least 10%, at least 20%, at least 30%, at least 40%, at least 50%, at least 60%, at least 70%, at least 80%, at least 90%, at least 95%, at least 99% or 100% compared to the acrylamide content of the low aromatic aqueous coffee extract prior to contact with the a carbon and/or silica based resin with adsorptive function.

BRIEF DESCRIPTION OF THE DRAWING

The invention will now be described further with reference to the following non-limiting FIGURE.

FIG. 1 shows an exemplary flow-chart of the method steps described herein.

A first step involves the provision of raw green coffee beans 5. These may be any suitable coffee beans 5, such as *Arabica* or *Robusta* beans, or a mixture thereof. The coffee beans are subjected to a roasting step 10 using conventional roasting processes to achieve desirably roasted beans.

The roasted beans are subjected to a grinding step 15. Grinding is typically effected using a roller or burr-type grinder, with the end particle size and distribution being selected depending on the subsequent extractions steps. For example, percolation extraction systems tend to rely on an average particle size of about 2 microns, whereas slurry-based processing systems may favour a finer particle size, such as down to about 300 microns.

The roasted and ground coffee is then subjected to an aroma recovery step 20, such as for example involving passing steam through the roasted and ground coffee. The steam is recovered and condensed to provide a high aromatic extract 25. The high aromatic extract 25 is set aside for subsequent use, as described below, or may be used directly in a continuous process where all of the steps are being conducted in parallel. The roasted and ground coffee which has been subjected to the aroma recover step is dearomatised by the process.

The dearomatised roasted and ground coffee is then passed to a primary extraction step 30 wherein hot water is passed through the roasted and ground coffee under pressure, such that the water is at a temperature of from 100 to 170° C. This produces a primary extract 35 which has a good flavour profile (albeit a low yield) and low thermal production markers.

The roasted and ground coffee is then passed to a secondary extraction step 40 wherein hot water is passed through the roasted and ground coffee under pressure, such that the water is at a temperature of from 140 to 230° C. This produces a secondary extract 45 which has a reasonable flavour profile and a good yield, albeit with moderate levels of thermal production markers, including acrylamide.

The roasted and ground coffee following the secondary extraction step 40, so-called spent coffee, can be passed to a tertiary extraction step 50. This would typically be hotter and for longer than the secondary extraction step 40, in a temperature range of 200 to 260° C. The roasted and ground coffee following this step would be a waste product, optionally combusted for thermal energy. The tertiary extract 55 from this tertiary extraction step 50 shows also an amount of acrylamide.

The process as described so far has provided four extracts (25, 35, 45, 55). The tertiary extract 55 which is a low aromatic extract and, if desired the secondary extract 45, are then treated with a carbon and/or silica based resin with adsorptive function in an acrylamide reduction step 60 to reduce the levels of acrylamide in the product. The high aromatic extract 25 and the primary extract 35 are not subjected to the acrylamide reduction step 60 in order to avoid a loss of volatile flavour components.

The process optionally involves a concentration step 65. This can be performed on any of the extracts (35, 45, 55) to increase the solids of the extract. The secondary and tertiary extracts can be concentrated before the acrylamide reduction step 60, if desired, to decrease the volume of extract to be treated.

The process involves a mixing step 70. This involves blending the high aromatic extract 25 with the other extracts (35, 45, 55). The extracts can be blended simultaneously or in turn. The mixing step 70 can be conducted before or after any optional concentration step 65.

The product of the mixing step 70 is a concentrated liquid coffee extract 75 suitable for reconstitution with hot water to form a coffee beverage. Alternatively, the concentrated liquid coffee extract 75 can be dried, such as by spray-drying or freeze-drying to produce an instant soluble coffee powder 80.

The invention will now be further understood with reference to the following non-limiting examples.

Example 1

As described in FIG. 1 from a single batch of roast and ground *Robusta* coffee a high aromatic coffee extract was extracted, comprising of 84 wt. % of the total coffee dry matter.

The roast and ground coffee was further extracted in to obtain a secondary extract representing a low aromatic extract, with a yield of 16 wt. % of the total coffee dry matter. The resulting acrylamide levels in the secondary extract were 2200 µg/kg on dry matter solid basis.

The secondary extract was subsequently passed over a tightly packed resin material Lewatit® AF with a residence time over the resin between 100 and 110 s. The acrylamide concentration of the resin treated secondary extract was 1100 µg/kg on dry matter solid basis which translated to a reduction of a minimum of 50% of acrylamide of the concentration in the secondary extract.

Afterwards the secondary extract was mixed with the high aromatic aqueous coffee extract on a weight ratio of 5:1 and concentrate to obtain a final liquid coffee concentrate, with a 55 wt % solids level (i.e. 55 wt % of the concentrate is solids when fully dehydrated).

The concentrate was assessed with coffee experts and less impact on flavour was found. The total acrylamide reduction in a final product was 10%.

Example 2

A mixture of 30% *Arabica* and 70% *Robusta* coffee was roasted and ground. The resulting roast and ground coffee was extracted through a split stream extraction (as described in reference WO 2007/043873), resulting in an aroma-rich extract, a primary extract and a secondary extract.

The aroma-rich extract was the high aromatic coffee extract and left untreated. The aroma-rich extract had 56 wt % of the total coffee dry matter. The resulting acrylamide level was 800 µg/kg on dry matter solid basis.

The primary extract was significantly lower in aroma compared to the aroma-rich extract. The primary extract had acrylamide levels of 1300 µg/kg on dry matter solid basis. The primary extract comprises 27 wt. % of the total coffee dry matter.

50% of the primary extract was left untreated and 50% of the extract was passed separately over a tightly packed resin material Lewatit® AF5 with a residence time of the extract over the resin between 100 and 110 s. The resulting acrylamide level in the treated primary extract was less than 600 µg/kg on dry matter solid basis.

From the roast and ground coffee obtained after the primary extract a further low aromatic secondary extract was obtained through a further extraction process as described in step 40 of FIG. 1. Said secondary extract had an acrylamide level of 2100 µg/kg on dry matter solid basis and a yield of 17 wt. % of the total coffee dry matter.

100% of the secondary extract was passed over a tightly packed resin material Lewatit® AF5 column with a residence time of the extract over the resin between 100 and 110 s. The resulting treated secondary extract had an acrylamide level of less than 1100 µg/kg on dry matter solid basis, which translated into a reduction of a minimum of 50% of acrylamide.

The 100% treated low aromatic secondary extract was then combined to the untreated primary extract and the untreated aroma-rich extract to obtain a final total extract on which acrylamide content was measured. The result in acrylamide reduction for this final total extract is reported in Table 1 row 1 (22%).

In another sample the 50% treated primary extract was combined to the 100% treated secondary extract and the remaining untreated primary extract to obtain a final recombined extract on which acrylamide content was measured. Table 1 row 2 shows the results in acrylamide reduction for this final recombined extract (25%).

The reduction in acrylamide level in the final product resulting from the combination of these two extract is 25%. Acrylamide reduction on the combined final extract was determined by HPLC through a standard method to determine acrylamide concentration.

TABLE 1

| | Reduction in | | Impact on | |
|---|---|---|---|---|
| Samples mixed with high aromatic extract | acrylamide (%) in final product | Reduction in aroma (%) | aroma in final product | Extraction technique |
| 100% low aromatic secondary extract treated | 22 | 16 | Moderate | Split stream |
| 50% primary extract treated and 100% low aromatic secondary extract treated | 25 | 25 | Moderate | Split stream |

*Low aromatic liquid coffee extracts*

Subsequently the aroma-rich extract, was mixed with the primary extract and the secondary extract in a wt/wt ratio of 56/27/17 wt % of the total coffee dry matter.

The evaluation of the aroma profile was carried out via gas chromatography selecting key aroma compounds. A limited impact on flavour was found (see Table 1).

The resulting combined final extract was then evaporated to a DM of 55%, obtaining a concentrate. The concentrate was packed into a final product and/or dried and packed as a soluble coffee. The concentrate was assessed with coffee experts and limited impact on flavour was found in the final product.

Example 3

As described in Example 1, the low aromatic aqueous coffee extract obtained by extraction of the roast and ground coffee as described in FIG. 1 was treated over a Lewatit® AF5 resin, resulting in a 50% reduction of acrylamide on the treated low aromatic aqueous coffee extract.

Additionally, the primary extract obtained through the primary extraction of step 30 of FIG. 1 and having acrylamide level of 1000 ug/kg on dry matter solid basis was only partially treated over a tightly packed resin material Lewatit® AF with a residence time of the extract with the resin between 100 and 110 s. After the treatment on resin the treated fractions of primary extract were recombined with the untreated portion of the primary extract and mixed in different ratio combinations with the low aromatic extract (i.e. fully treated secondary extract), i.e. they provided a mixture of treated primary extract, untreated primary extract and treated secondary extract.

The acrylamide concentration of the resin-treated primary extracts was less than 500 μg/kg on dry matter solid basis for both extracts, which resulted in a reduction of a minimum of 50% of acrylamide for each.

Subsequently the treated as well as untreated primary extracts were mixed to the low aromatic coffee extract on a weight basis of 5:1 and concentrate as described hereabove to obtain a final liquid coffee concentrate.

After freeze-drying the final product was analysed. Table 2, row 1 and 2, reports the result of acrylamide reduction in the final concentrate in the case of a 40% fraction of treated primary extract and 60% fraction of treated primary extract (Table 2 line 1 and 2). The reduction in the range of 38 to 54 with limited impact on flavour only for the 40% primary extract treated sample.

The concentrate was assessed with coffee experts, acrylamide levels were assed with HPLC and aromas were analysed by gas chromatography.

To provide comparative data the inventors also investigated the effects of treating the primary extract.

TABLE 2

| | Low aromatic liquid coffee extracts | | | |
| Samples | Reduction in acrylamide (%) in final product | Reduction in aroma in final product (%) | Impact on aroma in final product | Extraction technique |
| --- | --- | --- | --- | --- |
| 40% primary extract treated + 100% secondary extract treated | 38 | 7 | Limited | Once through |
| 60% primary extract treated + 100% secondary extract treated | 54 | 30 | Substantial | Once through |

Comparative Example

A single batch of ground *Robusta* coffee as described in Example 1 was extracted via a once through extraction. The extraction resulted in a high aromatic coffee extract with a 84 wt. % of the total coffee dry matter. After primary extraction the dearomatized coffee was further extracted to obtain a low aromatic aqueous extract with 16 wt. % of the total coffee dry matter. The acrylamide level of the latter was 2200 ug/kg on dry matter solid basis.

The high and low aromatic extracts were combined to a 5:1 w/w ratio.

A Lewatit® AF-5 was used to treat the combined extracts. The treated extract was concentrated as described hereabove to obtain a final concentrate and it was assessed with coffee experts, acrylamide levels were assed via HPLC analyses and key aroma compounds were analysed by gas chromatography. Substantial impact on flavour was found in the final product, the reduction of aroma was 100%, and the reduction of acrylamide was 91%. As will be appreciated, the treatment time and complexity from treating the whole extract was significant.

The present invention is not to be limited in scope by the specific embodiments described herein. Indeed, various modifications of the invention in addition to those described herein will become apparent to those skilled in the art from the foregoing description and accompanying FIGURES. Such modifications are intended to fall within the scope of the appended claims. Moreover, all aspects and embodiments of the invention described herein are considered to be broadly applicable and combinable with any and all other consistent embodiments, including those taken from other aspects of the invention (including in isolation) as appropriate.

Unless defined otherwise, all technical and scientific terms used herein have the same meaning as commonly understood by the ordinary person skilled in the art to which the invention pertains.

Various publications and patent applications are cited herein, the disclosures of which are incorporated by reference in their entireties.

The invention claimed is:

1. A process for producing a liquid coffee concentrate, the process comprising the steps of:
   a) subjecting roasted and ground coffee to an aroma recovery process to obtain:
      (i) a high aromatic aqueous coffee extract, the high aromatic aqueous coffee extract having a ratio of 2,3 butanedione to ethylguaiacol of more than 30:1; and
      (ii) a first dearomatized roasted and ground coffee;
   b) subjecting the first dearomatised roasted and ground coffee to an initial aqueous extraction at a temperature of from 140° C. to 170° C. to obtain a further aqueous coffee extract and a second dearomatised roasted and ground coffee;
   c) subjecting the second dearomatised roasted and ground coffee to an aqueous extraction at a temperature of from 200 to 260° C. to obtain a low aromatic aqueous coffee extract having a first acrylamide content, the low aromatic aqueous coffee extract having a ratio of 2,3 butanedione to ethylguaiacol of less than 30:1;
   d) contacting the low aromatic aqueous coffee extract with a carbon and/or silica based resin with adsorptive function to provide a low aromatic aqueous coffee extract having a second acrylamide content; and
   e) combining the low aromatic aqueous coffee extract having a second acrylamide content, the high aromatic aqueous coffee extract, and the further aqueous coffee extract to provide a liquid coffee concentrate,
   wherein the second acrylamide content is lower than the first acrylamide content;
   wherein the aroma recovery process involves contacting the roasted and ground coffee with steam and obtaining the high aromatic aqueous coffee extract from the steam.

2. The process of claim 1, wherein the low aromatic aqueous coffee extract having a first acrylamide content is obtained by aqueous extraction of the dearomatised roasted and ground coffee, wherein the aqueous extraction is conducted at a temperature of 210 to 230° C.

3. The process according to claim 1, wherein the process further comprises a step between step d) and step e) of concentrating the low aromatic aqueous coffee extract having a second acrylamide content.

4. The process according to claim 1, wherein contacting the low aromatic aqueous coffee extract with a carbon and/or silica based resin with adsorptive function comprises flowing the low aromatic aqueous coffee extract through a bed comprising the resin.

5. The process according to claim 1, wherein the resin has a size exclusion functionality.

6. The process according to claim 1, wherein the process further comprises regenerating the spent resin.

7. The process according to claim 1, wherein the carbon and/or silica based resin with adsorptive function comprises particles having a surface area between 700 $m^2/g$ and 1500 $m^2/g$.

8. The process according to claim 1, wherein the carbon and/or silica based resin with adsorptive function comprises particles having a pore volume between 0.08 $cm^3/g$ and 0.2 $cm^3/g$.

9. The process according to claim 1, wherein the second acrylamide content is at least 10%, at least 20%, at least 30%, at least 40%, at least 50%, at least 60%, at least 70%, at least 80%, at least 90%, at least 95%, at least 99% or 100% lower than the first acrylamide content, the first acrylamide content being greater than 10% of a total amount of acrylamide present in all extracts obtained in the aqueous extraction.

10. The process according to claim 1, further comprising a step of drying the liquid coffee concentrate, thereby producing a soluble coffee product.

11. The process according to claim 1, wherein the carbon and/or silica based resin with adsorptive function comprises particles having a surface area of about 1200 $m^2/g$.

12. The process according to claim 1, wherein the carbon and/or silica based resin with adsorptive function comprises particles having a pore volume of about 0.15 $cm^3/g$.

* * * * *